United States Patent
Al Sayeed et al.

(10) Patent No.: US 10,735,837 B1
(45) Date of Patent: Aug. 4, 2020

(54) PARTIAL ACTIVATION OF A MEDIA CHANNEL ON CHANNEL HOLDER-BASED OPTICAL LINKS

(71) Applicant: Ciena Corporation, Hanover, MD (US)

(72) Inventors: Choudhury A. Al Sayeed, Stittsville (CA); Radmila Kovacevic, Carp (CA); Edward Chen, Kanata (CA); David Miedema, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/508,392

(22) Filed: Jul. 11, 2019

(51) Int. Cl.
*H04J 14/00* (2006.01)
*H04Q 11/00* (2006.01)
*H04J 14/02* (2006.01)

(52) U.S. Cl.
CPC ...... *H04Q 11/0066* (2013.01); *H04J 14/0212* (2013.01); *H04J 14/0257* (2013.01); *H04Q 11/0005* (2013.01); *H04Q 2011/0016* (2013.01); *H04Q 2011/0086* (2013.01)

(58) Field of Classification Search
CPC .................................................. H04J 14/0212
See application file for complete search history.

(56) References Cited

U.S. PATENT DOCUMENTS

| | | | |
|---|---|---|---|
| 8,364,036 B2 | 1/2013 | Boertjes et al. | |
| 9,060,215 B2 | 6/2015 | Miedema | |
| 9,252,913 B2 | 2/2016 | Al Sayeed et al. | |
| 9,276,696 B2 | 3/2016 | Al Sayeed et al. | |
| 9,344,191 B2 | 5/2016 | Al Sayeed et al. | |
| 9,577,763 B2 | 2/2017 | Al Sayeed et al. | |
| 9,686,176 B2 | 6/2017 | Traxler et al. | |
| 9,768,870 B2 | 9/2017 | Miedema et al. | |
| 9,768,902 B2 | 9/2017 | Al Sayeed et al. | |
| 9,806,803 B2 | 10/2017 | Bownass et al. | |
| 9,819,565 B2 | 11/2017 | Djukic et al. | |
| 9,906,294 B2 | 2/2018 | Al Sayeed et al. | |
| 9,986,317 B1 | 5/2018 | Al Sayeed et al. | |
| 10,148,384 B2 | 12/2018 | Swinkels et al. | |
| 10,200,770 B2 | 2/2019 | Swinkels et al. | |
| 10,237,011 B2 | 3/2019 | Al Sayeed et al. | |

(Continued)

FOREIGN PATENT DOCUMENTS

WO    WO-2010027306 A1  *  3/2010  ............ H04W 72/10

OTHER PUBLICATIONS

ITU-T G.872, "ITU-T G.872: Architecture of optical transport networks", Jan. 2017, ITU-T, All Pages.*

*Primary Examiner* — David C Payne
*Assistant Examiner* — Pranesh K Barua
(74) *Attorney, Agent, or Firm* — Clements Bernard Walker; Christopher L. Bernard; Lawrence A. Baratta, Jr.

(57) ABSTRACT

An optical network element includes an optical multiplexing/demultiplexing device forming a degree; a channel holder source connected to the optical multiplexing/demultiplexing device; and a controller configured to, responsive to provisioning a media channel on the degree, wherein the media channel is a contiguous portion of optical spectrum supporting N channels, N>1, cause allocation of optical filter bandwidth in the optical multiplexing/demultiplexing device for M channels in the media channel, M<N, cause provisioning of the M channels in the media channel, and cause configuration of N−M channel holders in the media channel from the channel holder source.

20 Claims, 11 Drawing Sheets

(56) References Cited

U.S. PATENT DOCUMENTS

| | | | | |
|---|---|---|---|---|
| 2005/0163151 | A1* | 7/2005 | Ferguson | F42C 15/42 370/449 |
| 2008/0291919 | A1* | 11/2008 | Dunbar | H04L 45/245 370/395.3 |
| 2009/0025027 | A1* | 1/2009 | Craner | H04H 20/103 725/32 |
| 2009/0034971 | A1* | 2/2009 | Sadanada | H04L 43/0811 398/49 |
| 2011/0255443 | A1 | 10/2011 | Ashwood-Smith et al. | |
| 2012/0087658 | A1* | 4/2012 | Jander | H04J 14/02 398/48 |
| 2012/0321306 | A1* | 12/2012 | Wellbrock | H04J 14/021 398/48 |
| 2014/0369679 | A1* | 12/2014 | Vassilieva | H04B 10/2572 398/26 |
| 2016/0127257 | A1* | 5/2016 | Wang | H04L 47/762 370/242 |
| 2016/0182982 | A1* | 6/2016 | Schmidtke | H04L 45/38 398/51 |
| 2016/0344470 | A1* | 11/2016 | Reddy Bovilla | H04B 10/03 |
| 2018/0006757 | A1* | 1/2018 | Prakash | H04B 10/27 |
| 2018/0076882 | A1* | 3/2018 | Prakash | H04B 10/03 |
| 2018/0084063 | A1 | 3/2018 | Miedema | |
| 2018/0123724 | A1* | 5/2018 | Zhang | H04J 14/0212 |
| 2019/0089463 | A1* | 3/2019 | Zhang | H04B 10/5161 |
| 2019/0103939 | A1 | 4/2019 | Al Sayeed et al. | |
| 2019/0173602 | A1 | 6/2019 | Al Sayeed et al. | |
| 2020/0007965 | A1* | 1/2020 | Swinkels | H04J 14/0213 |

* cited by examiner

*(a) MC intent vs filter opening for the 1st signal*

*(b) MC intent vs filter opening for a 2nd adjacent signal*

*(c) MC intent vs filter opening for a 2nd non-adjacent signal*

*(d) Filter width matching MC intent when all intended signals deployed*

PARTIAL ACTIVATION OF A MEDIA CHANNEL ON CHANNEL HOLDER-BASED OPTICAL LINKS

FIELD OF THE DISCLOSURE

The present disclosure generally relates to optical networks. More particularly, the present disclosure relates to systems and methods for partial activation of a media channel on channel holder-based optical links.

BACKGROUND OF THE DISCLOSURE

Optical networks include nodes interconnected by optical links formed by fiber optic cables including various pre-amplifiers, post-amplifiers, optional intermediate line amplifiers, etc. One particular issue on optical links includes power control, namely the power on an optical link changes over time with the addition or removal of optical channels and such a process requires power control to adjust settings on the various components. There are various power control techniques utilized to control optical power over the optical links, responsive to capacity changes. With advance coherent modulation and the like, conventional power control techniques are slow, i.e., operate in seconds, leading to slow capacity changes. Speeding up such techniques can and does have a negative operational impact on existing in-service channels. A technique to deal with the control of optical power involves the use of so-called channel holders, which can include Amplified Stimulated Emission (ASE) sources, modulated lasers, unmodulated lasers, etc. Channel holders are used in optical links to keep optical spectrum in full-fill loading condition so that any capacity change activity can be digitally handled by switching the channel holders with traffic signals, i.e., there is no need to perform an optimization because any capacity change includes swapping a traffic-bearing channel for a channel holder or vice versa. That is, the power optimization only needs to be performed at turn-up when the timing does not impact the operation. Once the power is optimized, capacity changes are just swapping channels for channel holders or vice versa. This is more of a digital operation, whereas conventional power control techniques are more of an analog operation. That is, swapping an optical channel for a channel holder or vice versa can be performed much quicker than any conventional power control technique.

In addition to the movement towards channel-holder based optical links, there are also emerging techniques to better manage the optical spectrum usage, including flexible grid approaches, super channels (supercarriers), etc. For example, details of these optical spectrum techniques are described in commonly-assigned U.S. Pat. No. 10,200,770, issued Feb. 5, 2019, and entitled "Management of flexible grid and supercarriers in optical networks using a data model," the contents of which are incorporated by reference herein. As described herein, a Network Media Channel (NMC) is the bandwidth corresponding to the spectral width of an optical signal and a Media Channel (MC) is the spectral allocation in the medium which encompasses one or more NMCs and any imposed excess spectrum for optical filter penalties (e.g., filter roll-off), excess spectrum for future growth, etc. Multiple NMCs that support a single digital carrier are known as a supercarrier. A Media Channel can also be referred to as a super channel. Additional details are described in ITU-T Recommendation G.872 "Architecture of optical transport networks," (January 2017), the contents of which are incorporated by reference herein.

Media Channels can include a wide range of the optical spectrum that may be initially provisioned, but a Media Channel may not have actual NMCs configured therein. Of course, this eliminates many of the benefits of the channel-holder based approach. Thus, there is a need for supporting channel holders within intended Media Channels in spectral locations, where expected NMCs may not be provisioned yet, or deployed NMCs could be faulted due to loss of power.

BRIEF SUMMARY OF THE DISCLOSURE

In an embodiment, an optical network element includes an optical multiplexing/demultiplexing device forming a degree; a channel holder source connected to the optical multiplexing/demultiplexing device; and a controller configured to, responsive to provisioning a media channel on the degree, wherein the media channel is a contiguous portion of optical spectrum supporting N channels, N>1, cause allocation of optical filter bandwidth in the optical multiplexing/demultiplexing device for M channels in the media channel, M<N, cause provisioning of the M channels in the media channel, and cause configuration of channel holders in the media channel from the channel holder source, for N−M channels. The allocation of the optical filter bandwidth can include configuring a plurality of pixels in the optical multiplexing/demultiplexing device to connect to associated traffic ports of the M channels, and wherein the configuration of the N−M channel holders can include configuring a second plurality of pixels to connect to the channel holder source. The media channel can have a bandwidth intent to support the N channels, and wherein the allocation of optical filter bandwidth can be for less than the bandwidth intent. The optical multiplexing/demultiplexing device can be a Wavelength Selective Switch and the allocation of optical filter bandwidth includes switching a plurality of adjacent filters to a same switch port for each of the M channels, to provide an effective filter function as required for signal propagation of the M channels.

The controller can be further configured to detect a new channel different from the M channels, and cause allocation of optical filter bandwidth in the optical multiplexing/demultiplexing device for the new channel. The allocation of optical filter bandwidth can include a minimum spectral occupancy required by an optical signal or carrier plus a spectral deadband required on each side of that signal to avoid filter roll-off penalties. The controller can be further configured to detect loss of one of the M channels, cause deallocation of optical filter bandwidth in the optical multiplexing/demultiplexing device for the lost channel, and cause configuration of a channel holder for the lost channel from the channel holder source. The controller can be further configured to merge allocated optical filter bandwidth to a single optical filter space if spacing between two adjacent filter edges is less than a minimum spectral occupancy required to accommodate any signal bandwidth.

In another embodiment, an apparatus includes circuitry configured to, responsive to provisioning a media channel on a degree, wherein the media channel is a contiguous portion of optical spectrum supporting N channels, N>1, cause allocation of optical filter bandwidth in a optical multiplexing/demultiplexing device for M channels in the media channel, M<N; circuitry configured to cause provisioning of the M channels in the media channel; and circuitry configured to cause configuration of channel holders in the media channel from a channel holder source, for N−M channels. The allocation of the optical filter bandwidth can include configuring a plurality of pixels in the optical multiplexing/demultiplexing device to connect to associated traffic ports of the M channels, and wherein the configuration of the N–M channel holders includes configuring a second plurality of pixels to connect to the channel holder source. The media channel can have a bandwidth intent to support the N channels, and wherein the allocation of optical filter bandwidth can be for less than the bandwidth intent. The optical multiplexing/demultiplexing device can be a Wavelength Selective Switch and the allocation of optical filter bandwidth includes switching a plurality of adjacent filters to a same switch port for each of the M channels, to provide an effective filter function as required for signal propagation of the M channels.

The apparatus can further include circuitry configured to detect a new channel different from the M channels; and circuitry configured to cause allocation of optical filter bandwidth in the optical multiplexing/demultiplexing device for the new channel. The apparatus can further include circuitry configured to detect loss of one of the M channels; circuitry configured to cause deallocation of optical filter bandwidth in the optical multiplexing/demultiplexing device for the lost channel; and circuitry configured to cause configuration of a channel holder for the lost channel from the channel holder source. The apparatus can further include circuitry configured to merge allocated optical filter bandwidth to a single optical filter space if spacing between two adjacent filter edges is less than a minimum spectral occupancy required to accommodate any signal bandwidth.

In a further embodiment, a non-transitory computer-readable medium includes instructions that, when executed, cause a processor to perform the steps of, responsive to provisioning a media channel on a degree, wherein the media channel is a contiguous portion of optical spectrum supporting N channels, N>1, causing allocation of optical filter bandwidth in a optical multiplexing/demultiplexing device for M channels in the media channel, M<N; causing provisioning of the M channels in the media channel; and causing configuration of channel holders in the media channel from a channel holder source, for N–M channels. The allocation of the optical filter bandwidth can include configuring a plurality of pixels in the optical multiplexing/ demultiplexing device to connect to associated traffic ports of the M channels, and wherein the configuration of the N–M channel holders can include configuring a second plurality of pixels to connect to the channel holder source.

The media channel can have a bandwidth intent to support the N channels, and wherein the allocation of optical filter bandwidth can be for less than the bandwidth intent. The optical multiplexing/demultiplexing device can be a Wavelength Selective Switch and the allocation of optical filter bandwidth includes switching a plurality of adjacent filters to a same switch port for each of the M channels, to provide an effective filter function as required for signal propagation of the M channels. The instructions that, when executed, can further cause the processor to perform the steps of detecting a new channel different from the M channels; and causing allocation of optical filter bandwidth in the optical multiplexing/demultiplexing device for the new channel.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Figure 1:
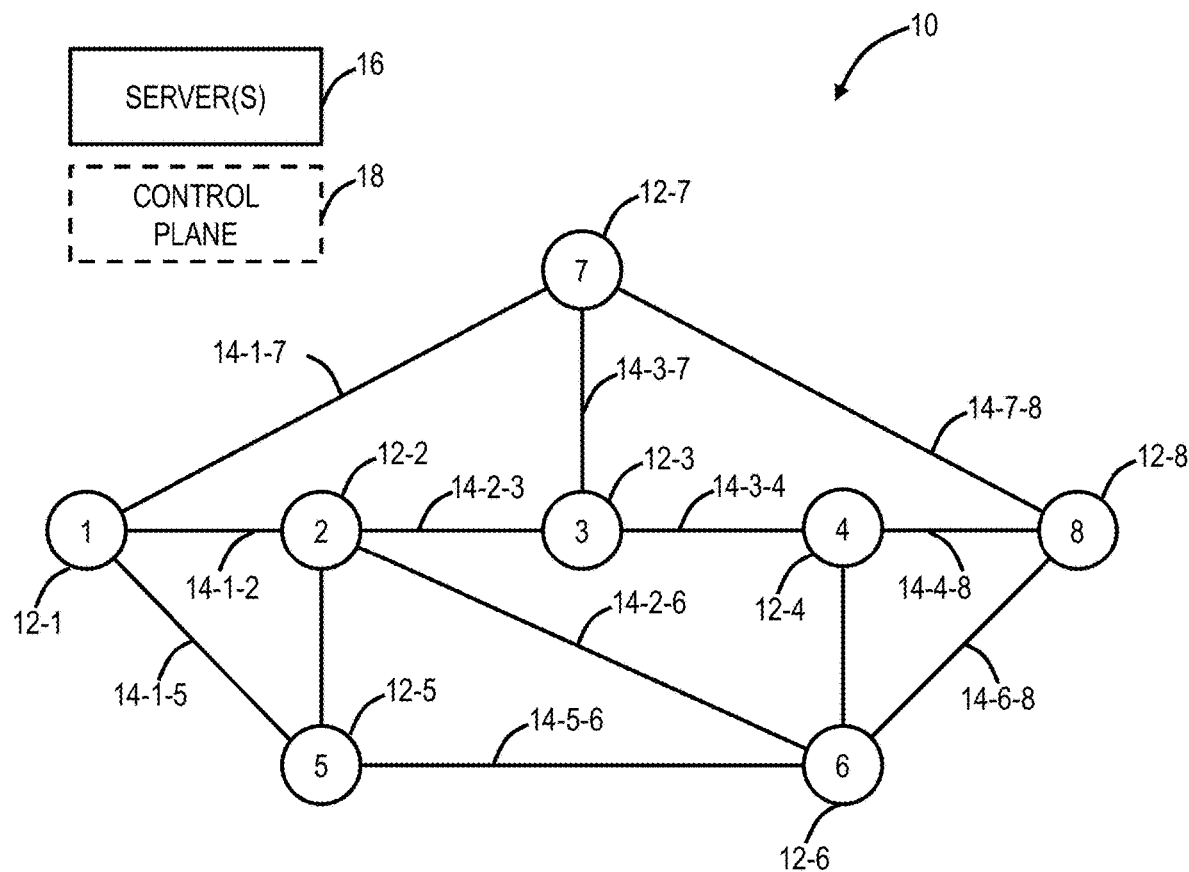
FIG. 1 is a network diagram of an example optical network.

The present disclosure relates to systems and methods for partial activation of a media channel on channel holder-based optical links. The present disclosure involves a large media channel (MC) or a super channel that is capable of accommodating multiple optical signals (NMCs) on a channel-holder based optical links, where only one or a small set of NMCs are initially deployed. For a channel holder-based optical link, each optical link is always intended to be spectrally full-filled, and all actuators within the link are pre-calibrated to tolerate Stimulated Raman Scattering (SRS), ripple. and tilt for full-fill spectrum power. In such channel holder-based optical links, if optical filters are open for media channels that are only partially filled, then the link loses valuable spectrum power compare to what it was calibrated for. That translates to a different SRS, ripple, and tilt profile into the link, and causes pre-existing channels to overshoot or undershoot. That is, unfilled media channels counter many of the benefits of channel holders. It also makes the existing channels less tolerable to sustain transient power offsets and Signal-to-Noise Ratio (SNR) margin impacts during capacity changes.

The present disclosure decouples the optical filter opening window with the intended MC or super channel bandwidth. The optical filter opening is proposed to match the deployed signal or NMC bandwidth plus additional spectral width on each side (known as dead bands) to avoid additional filter roll-off penalties. The rest of the unused space within the MC is left filled with channel holders. In this way, the total spectral power to the fiber is not penalized in initial deployments, when only one or a few NMCs are deployed within an intended super channel or MC. The present disclosure creates a plurality of effective optical filters within an intended MC, if necessary, to match deployed NMCs and can later extend, contract, split or merge a plurality of optical filters, if necessary, as more and more NMCs are deployed later. This is achieved by opening a plurality of adjacent granular optical filter channel plans matching the minimum pixel or slice bandwidth, supported by a Wavelength Selective Switch (WSS) hardware module to the same traffic switch port. Such an approach allows a plurality of granular optical filters to overlap with each other, creating a cumulative optical transfer function that is large enough to pass on NMCs error-free.

The present disclosure decouples the optical filter opening for a traffic channel from its logically intended or planned media channel properties. Here, the optical channel filter width becomes a function of the WSS module, and by switching plurality of adjacent filters to the same switch port, the present disclosure forms the effective filter function as required for signal propagation. Conventionally, the focus was always to match optical filter channel plan with the intended media channel or network media channel that can only be expanded or contracted but cannot be split or merged without affecting existing traffic. Accordingly, the present disclosure allows provisioning of media channels with a bandwidth intent and with less than full-fill signals therein allowing un-provisioned channels to have channel holders.

Optical Network

FIG. 1 is a network diagram of an example optical network 10. The optical network 10 includes nodes 12, labeled as nodes 12-1-12-8, interconnected to one another via links 14 which physically can include one or more optical fibers. The nodes 12 can also be referred to as network elements and can include, without limitation, Wavelength Division Multiplex (WDM) terminals, Dense WDM (DWDM) terminals, Optical Add/Drop Multiplexers (OADMs), Reconfigurable OADMs (ROADMs), optical cross-connects, optical switches, Packet-Optical Transport Systems (POTS), routers, switches, and the like. In various embodiments, the nodes 12 include various hardware and software to communicate with one another via channels over wavelengths/spectrum (the channels include data such as timeslots, packets, etc.). At a physical layer, the nodes 12 provide one or more wavelengths between one another over the links 14. Note, while FIG. 1 shows a single node 12 at each location, there can be multiple devices or network elements providing multiple wavelengths. For illustration purposes, each of the links is labeled as link 14-X-Y where X and Y are the nodes interconnected by the links 14.

The optical network 10 can also include one or more servers 16 and/or a control plane 18. The servers 16 can include or operate as, for example, a Software Defined Networking (SDN) controller, an SDN application, a Network Management System (NMS), an Element Management System (EMS), a planning tool, a Path Computation Element (PCE), etc. The control plane 18 provides an automated allocation of network resources in an end-to-end manner. Examples of control planes may include Automatically Switched Optical Network (ASON) as defined in ITU-T G.8080/Y.1304, Architecture for the automatically switched optical network (ASON) (February 2012), the contents of which are herein incorporated by reference; Generalized Multi-Protocol Label Switching (GMPLS) Architecture as defined in IETF Request for Comments (RFC): 3945 (October 2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections. That is, the control plane 18 is configured to establish end-to-end signaled connections to route channels and program the underlying hardware accordingly. SDN provides the management of network services through abstraction of lower-level functionality. This is done by decoupling the system that makes decisions about where traffic is sent (the control plane) from the underlying systems that forward traffic to the selected destination (the data plane).

The optical network 10 in FIG. 1 has a mesh architecture. Each of the links 14 is an Optical Multiplex Section (OMS) section, and each link 14 can include various amplifiers including pre-amplifiers, post-amplifiers, and intermediate line amplifiers (these are omitted in FIG. 1 for illustration purposes). Of note, the OMS sections can have different fill levels in terms of occupied channels or spectrum, which is the purpose of channel holders—to present a full-fill loading condition. For example, a wavelength #1 can be routed from node 12-1 to node 12-8 via the node 12-7 and a wavelength #2 can be routed from node 12-1 to node 12-3 via the node 12-7. Thus, the wavelengths #1, #2 share the link 14-1-7. As one of ordinary skill can appreciate, various other wavelengths can also be equipped such that the links 14 can have various different fill levels. Further, the wavelengths #1, #2 traverse an intermediate OADM at the node 12-7, thus this is said to be a cascaded optical network as different wavelengths can traverse multiple OMS sections (links 14). One of ordinary skill in the art will recognize an optical network can have other architectures. Further, the systems and methods described herein relate to an OMS section which is fundamental to any architecture. That is, any optical network has at least one OMS section.

Figure 2:
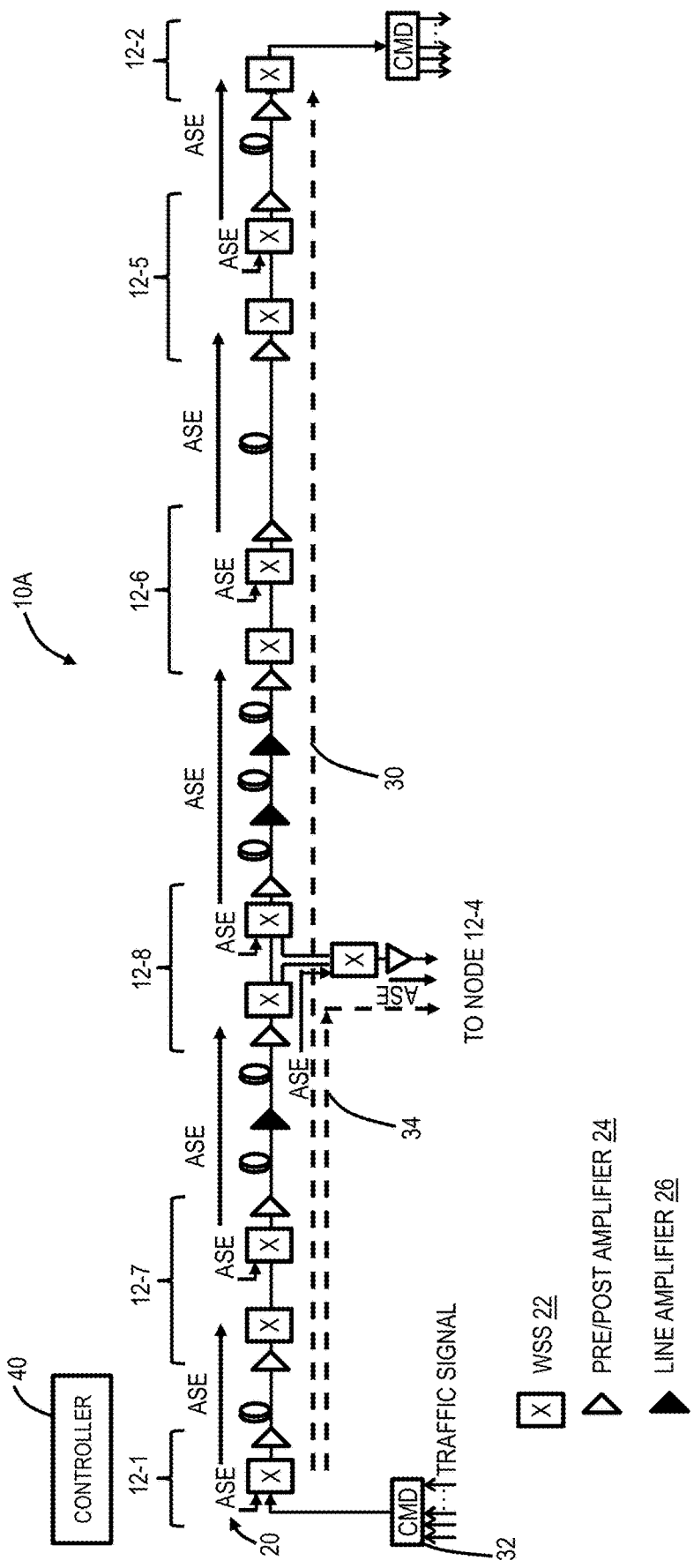
FIG. 2 is a network diagram of a portion of the optical network illustrating additional details for describing the use of channel holder sources.

FIG. 2 is a network diagram of a portion 10A of the optical network 10 illustrating additional details for describing the use of channel holder sources 20. For illustration purposes, the portion 10A is shown in a unidirectional configuration from the node 12-1 to the node 12-2 with intermediate nodes 12-7, 12-8, 12-6, 12-5 and a branching degree from the node 12-8 to the node 12-6. Those of ordinary skill in the art will recognize a practical embodiment includes complementary equipment in the opposite direction to form bidirectional connectivity. The nodes 12 include Wavelength Selective Switches (WSS) 22 for each degree, pre/post amplifiers 24, and some of the links 14 include line amplifiers 26. Note, the WSS 22 can generally be defined as an OADM device/OADM multiplexer circuit pack, namely other degree forming components are also contemplated. For illustration purposes, a traffic signal 30 is shown between the node 12-1 and the node 12-2, and the traffic signal is added/dropped via a multiplexer/demultiplexer 32. Another traffic signal 34 is shown between the node 12-1 and through the node 12-8 to the node 12-6. Note, at the node 12-1, the traffic signals 30, 34 are added together at the multiplexer/demultiplexer 32, but these signals 30, 34 are separated at the node 12-8.

The channel holder sources 20 can be injected at each WSS 22 in the multiplexer direction to replicate a channel's signal spectral shape, such that unoccupied or faulted channels can be present on the links 14 for optical power purposes. In an embodiment, the channel holder sources 20 can be ASE-based, modulated, unmodulated, etc. An objective is to fill in the spectrum on the links 14 initially so that each OMS section remains fulfill regardless of how many traffic channels are actually equipped. For example, the channel holder sources 20 can be injected locally to fill empty spectrum space, where there is no traffic signal present. When a traffic signal is provisioned or appears from an upstream node 12, the spectrum space is switched from the channel holder sources 20 to the traffic switch port to make adequate spectral space for the traffic signal.

With the spectrum at full-fill and the channel holder sources 20 being launched at the same power level as the traffic signals, the total power within each OMS link 14 remains constant; overcapacity changes that keep SRS, ripple, tilt, Spectral Hole Burning (SHB) impact on the OMS link 14 the same in the steady-state. The long chain of amplifiers 24, 26 can be either gain controlled or Total Output Power (TOP) controlled in their respective OMS link 14, i.e., on one OMS link 14, all amplifiers can be gain controlled, whereas, in the next OMS link 14, all amplifiers can be TOP controlled.

A controller 40 can be communicatively coupled to the OADM nodes 12 and the intermediate optical line amplifiers. In an embodiment, the controller 40 can be "in-skin" where it is part of one or more of the OADM nodes 12, i.e., a module contained therein. In another embodiment, the controller 40 can be an external device that is in communication with the various nodes. In either embodiment, the controller 40 is generally a processing device that obtains inputs from the optical network 10 and provides outputs for configuring the optical network 10. The controller 40 can perform a control algorithm/loop for managing wavelengths/spectrum from a physical perspective at Layer 0. In one aspect, the controller 40 is configured to add/remove wavelengths/spectrum from the spans in a controlled manner to minimize impacts to existing, in-service, traffic-carrying channels. For example, the controller 40 can adjust modem launch powers, optical amplifier gain, Variable Optical Attenuator (VOA) settings, WSS parameters, etc.

In various embodiments described herein, the controller 40 is configured to manage channel holders through the WSS 22 over an optical link such that each link is at a full-fill condition. The controller 40 further manages the channel holders with media channels as well in part via configuring the optical filter bandwidth of the WSS 22 such that the filter only supports provisioned channels in the media channel allowing un-provisioned channels to remain filled by the channel holders.

Media Channel Filter

Figure 3:
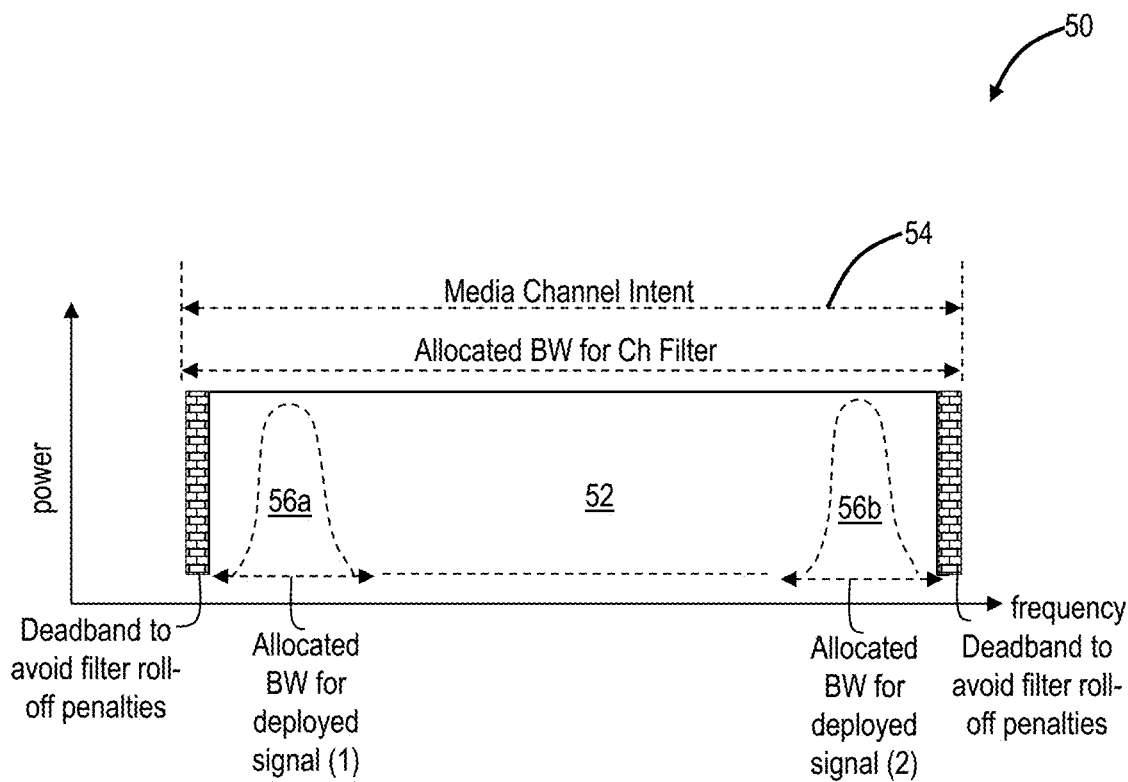
FIG. 3 is a graph of optical spectrum with a configured media channel.

FIG. 3 is a graph 50 of optical spectrum with a configured media channel 52. In this example, the media channel 52 has a bandwidth intent 54. That is, if a media channel 52 with multiple carriers or with a plurality of signals is intended to be deployed, an optical filter on the WSS 22 is open right away to match the bandwidth intent 54 regardless of an actual number of carriers or signals deployed within the media channel 52 initially. For example, assume there are two deployed signals 56a, 56b, but the rest of the media channel 52 is initially unequipped. The media channel 52 occupies the bandwidth intent 54, which includes provisionable optical spectrum for the signals 56 as well as a frequency deadband on either side to avoid filter roll-off penalties. Opening the optical filter wide enough along the path to accommodate the media channel 52 is the only way to ensure the intended media channel 52 can be deployed in the future without worrying about adequate bandwidth. Once a channel plan is defined to open an optical filter space on the flexible grid WSS 22 module, the channel plan can be extended or contracted without affecting existing traffic. However, any split or merge operation can be traffic affecting in some WSS implementation since that requires deleting existing channel plan (sending to a blocked state) and then writing down a new channel plan for re-shaping optical filters.

This open optical filter bandwidth creates significant issues in a channel holder-based system. That is, when a media channel 52 is provisioned, wider filters are created for traffic signals replacing the channelized ASEs. If the missing channel power is not replaced with intended traffic signals initially, the empty portions of the media channel 52 will reduce the total power into the fiber, compared to the original full-fill condition. Based on the size of the media channel 52, it can substantially reduce the total optical power, and hence, the ability for existing channels to tolerate transients during fast capacity changes. Also, if the system actuators are calibrated/optimized to tolerate SRS, tilt, ripple for full-fill channel loading condition, reducing total power by creating spectral holes will change SRS, tilt, and ripple, and the original actuator settings will not be optimized any more for the new condition.

Effectively, this means, with prior art techniques, all signals or carriers within the media channel 52 will have to be deployed when the media channel 52 is provisioned or need to leave a hole in the spectrum that will cause transient penalties during fast capacity changes. Of course, this adds significant issues in operation.

Wavelength Selective Switch Configuration

Figure 4:
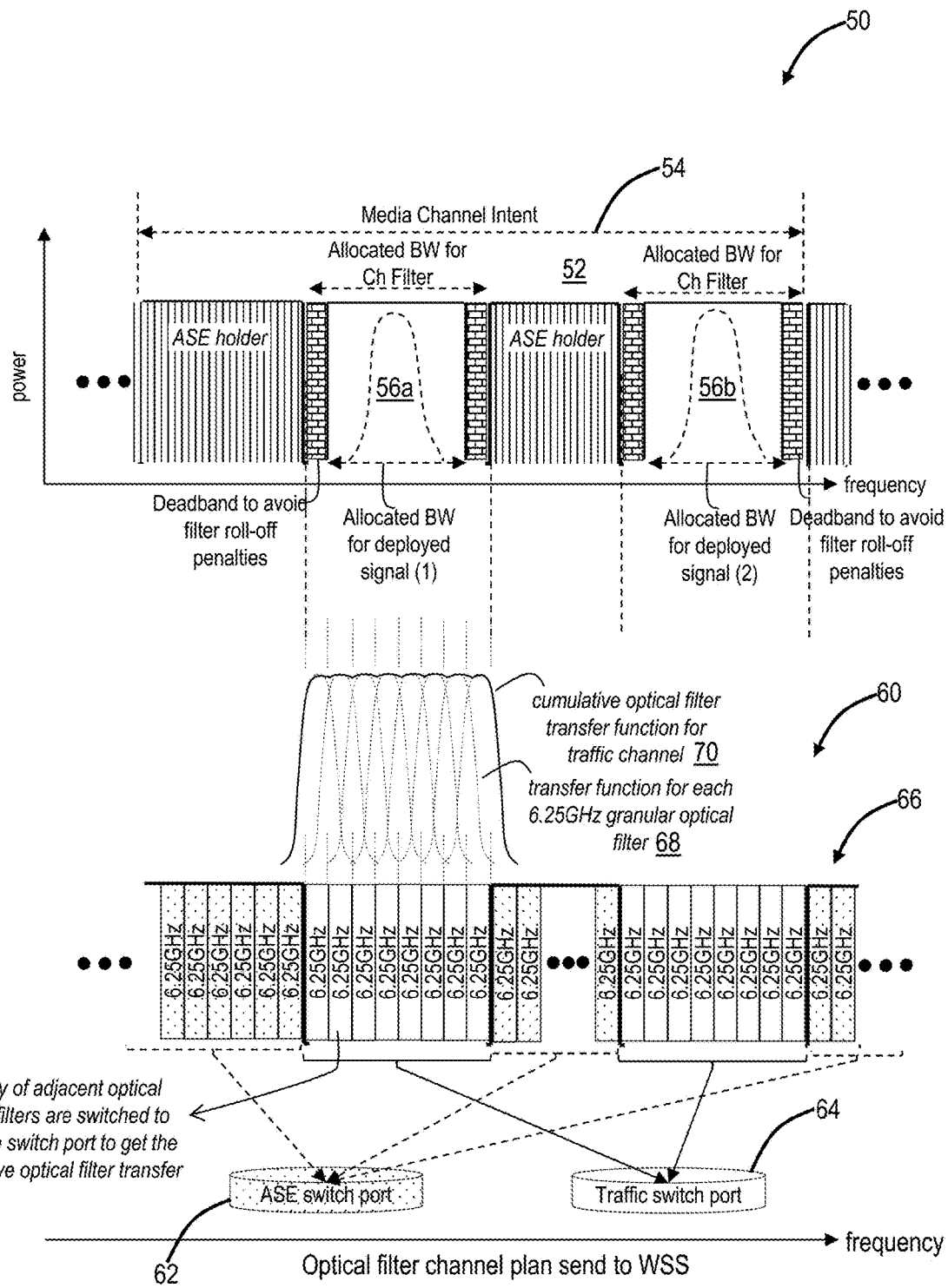
FIG. 4 is a graph of optical spectrum with a corresponding filter plan based on a Wavelength Selective Switch (WSS)

FIG. 4 is a graph 50 of optical spectrum with a corresponding filter plan 60 based on the WSS 22. As illustrated in FIG. 2, the WSS 22 is an optical multiplexing/demultiplexing device that forms a degree. The conventional technique with respect to media channels 52 is to open the WSS 22 filters to support the entire bandwidth as defined by the bandwidth intent 54, regardless of the actually deployed signals 56 (NMCs). The present disclosure only opens the WSS 22 filters as needed for the actually deployed signals 56, independent of the bandwidth intent 54. As such, the non-deployed spectrum in the media channel 52 can still have the channel holder present, enabling channel holders to coexist with media channels 52.

As described herein, the adequate "switchable" optical filter bandwidth for the WSS 22 is the effective optical filter opening that is wide enough to pass a deployed optical signal or network media channel without costing any additional filter penalty. The effective filter opening is created by opening a plurality of adjacent granular optical filters to the same traffic switch port that ultimately creates the cumulative filter transfer function, where, each granular optical filter width ≥the minimum pixel or slice channel plan the WSS 22 can handle. For example, if a flexible WSS 22 can handle a minimum of 6.25 GHz channel plan or optical filter provisioning, then the proposal is to switch a plurality of 6.25 GHz granular optical filters to match the switchable bandwidth from an ASE switch port 62 to a traffic switch port 64. The "switchable" optical filter bandwidth always remains gridded to the minimum pixel or slice channel plan supported by the WSS 22.

In FIG. 4, the media channel 52 has a bandwidth equal to the bandwidth intent 54. However, the WSS 22 is provisioned to open pixels 66 to support provisioned signals 56a, 56b. That is, in FIG. 4 compared to FIG. 3, the WSS 22 is open only to switch the signals 56a, 56b from the traffic switch port 64. The bandwidth of the WSS 22 is not open to the bandwidth intent 54. In this example, for the signal 56a, the WSS 22 has 8 pixels 66 open (each at 6.25 GHz) for the 50 GHz total. Each pixel 66 has an individual transfer function 68 which add together for a cumulative optical filter transfer function 70. That is, a plurality of adjacent optical channel filters (pixels 66) are switched to the same switch port 64 to get the cumulative optical filter transfer function 70.

As new signals are added in between or their power shows up from upstream following a fix of fiber faults, in the media channel 52, the size of the switchable bandwidth is dynamically managed by the WSS 22, that switches new sets of granular optical filters from the ASE switch port 62 to the traffic switch port 64. In this way, any optical filter expansion/contraction, or split/merge operation becomes a simple digital switch from one port to another without worrying about the bandwidth for individual NMCs and their exact spectral locations.

Process for Allocating Optical Spectrum for a Media Channel

Figure 5:
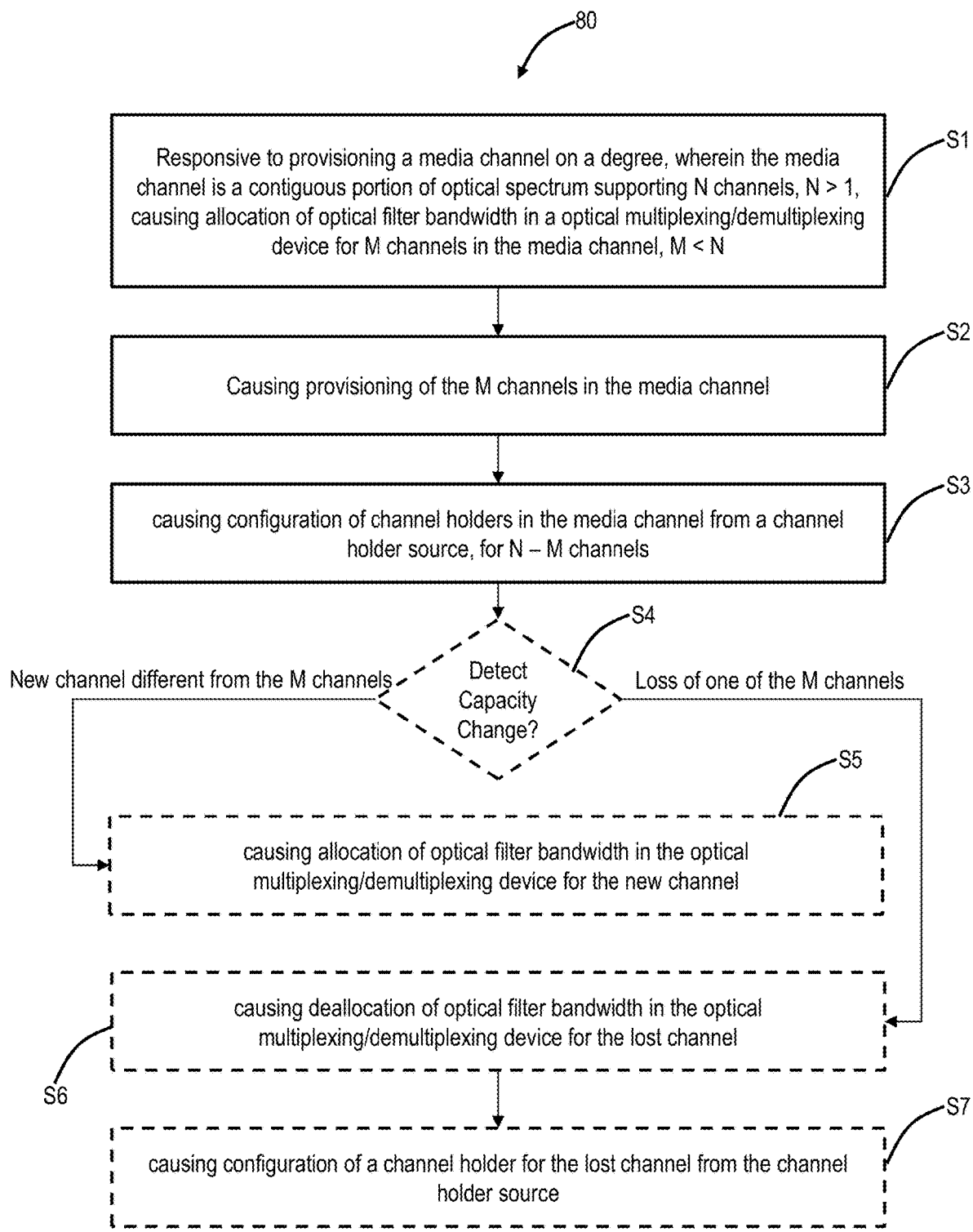
FIG. 5 is a flowchart of a process for allocating optical spectrum for a media channel while supporting channel holders in unequipped portions of the media channel.

FIG. 5 is a flowchart of a process 80 for allocating optical spectrum for a media channel while supporting channel holders in unequipped portions of the media channel. The process 80 includes, responsive to provisioning a media channel on a degree, wherein the media channel is a contiguous portion of optical spectrum supporting N channels, N>1, causing allocation of optical filter bandwidth in an optical multiplexing/demultiplexing device for M channels in the media channel, M<N (step S1); causing provisioning of the M channels in the media channel (step S2); and causing configuration of channel holders in the media channel from a channel holder source, for N–M channels (step S3).

The process 80 can include detecting a capacity change (step S4). If the capacity change includes detecting a new channel different from the M channels, the process 80 can include causing allocation of optical filter bandwidth in the optical multiplexing/demultiplexing device for the new channel (step S5). If the capacity change includes detecting loss of one of the M channels, the process 80 includes causing deallocation of optical filter bandwidth in the optical multiplexing/demultiplexing device for the lost channel (step S6), and causing configuration of a channel holder for the lost channel from the channel holder source (step S7). The process 80 can also include merging allocated optical filter bandwidth to a single optical filter space if the spacing between two adjacent filter edges is less than a minimum spectral occupancy required to accommodate any signal bandwidth.

The allocation of the optical filter bandwidth can include configuring a plurality of pixels in the optical multiplexing/demultiplexing device to connect to associated traffic ports of the M channels, and the configuration of the N–M channel holders can include configuring a second plurality of pixels to connect to the channel holder source. The media channel has a bandwidth intent to support the N channels, and the allocation of optical filter bandwidth is for less than the bandwidth intent. The optical multiplexing/demultiplexing device can be a Wavelength Selective Switch, and the allocation of optical filter bandwidth can include switching a plurality of adjacent filters to the same switch port for each of the M channels, to provide an effective filter function as required for signal propagation of the M channels.

In an embodiment, the process 80 can be implemented via instructions stored in a non-transitory computer-readable medium. In another embodiment, the process 80 can be implemented via circuitry configured to perform the corresponding functions. In a further embodiment, an optical network element can implement the process 80. The optical network element includes an optical multiplexing/demultiplexing device forming a degree; a channel holder source connected to the optical multiplexing/demultiplexing device; and a controller configured to perform the process 80.

The process 80 enables the creation of a logical intent for allocating spectrum for a media channel or super channel between two ports. Again, the media channel or the super channel intent is planned to be wide enough to accommodate a plurality of network media channels, signals, or carriers over the lifetime of that media channel or super channel. The process 80 only allocates adequate optical filter bandwidth where a network media channel, signal or a carrier is intended to be added currently and any unallocated spectral space within the media channel or super channel intent, where a signal or network media channel is not yet added, is filled with the channel holders.

Also, the process 80 includes switching away from the channel holder to create allocated optical filter space on the traffic switch port 64 only when signal power is detected at the switch input. The adequate optical filter space includes the minimum spectral occupancy required by the optical signal or carrier, plus any spectral deadbands required on each side of that signal to avoid filter roll-off penalties. If two or more signals are deployed within the media channel or super channel, then two or more optical filter spaces are allocated based on signals' bandwidth or minimum spectral occupancies, spectral locations, and minimum channel spacing required between adjacent signals.

The allocated plurality of optical filter spaces within a media channel or super channel is merged to a single optical filter space if the spacing between two adjacent filter edges is less than the minimum spectral occupancy required to accommodate any signal bandwidth. In reverse, if one or more signals, or network media channels are de-provisioned within the bandwidth intent 54, the optical filter allocated for remaining signals are then dynamically adjusted avoiding additional filter roll-off penalties, and the rest of the unallocated spectral space within the bandwidth intent 54 is then filled with channel holders. Similarly, if one or more NMCs lose their optical signal power due to an upstream fiber pinch or cut, the NMCs can be declared as "faulted," and the spectral space can be re-allocated to channel holders.

Example Operations

Figure 6A:
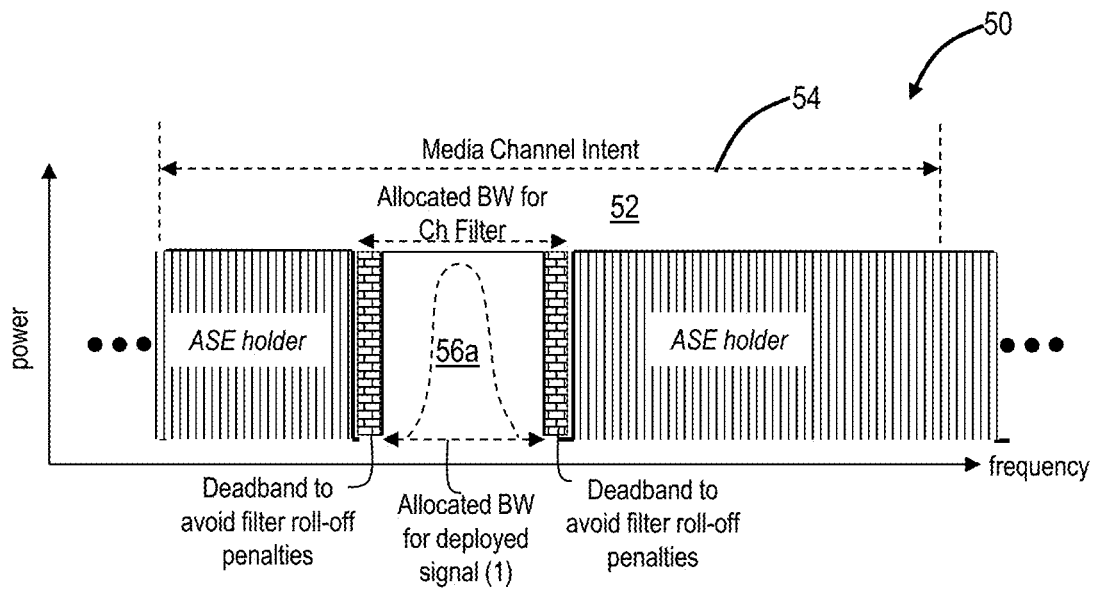
FIGS. 6A-6D are graphs of optical spectrum illustrating example operations on a media channel including initial provisioning and subsequent channel additions.
Figure 6B:
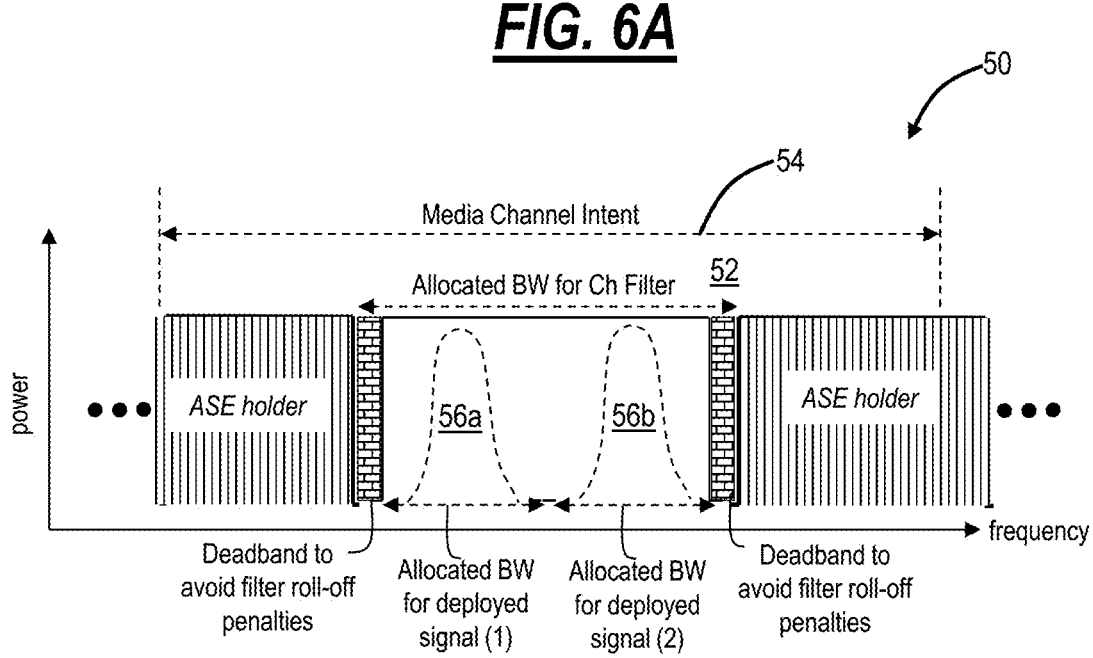
Figure 6C:
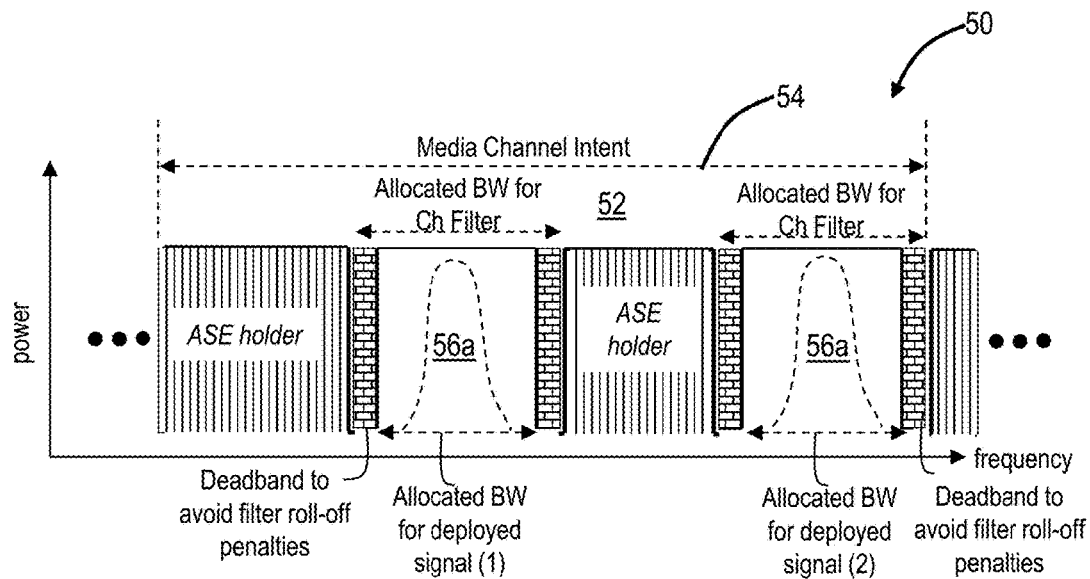
Figure 6D:
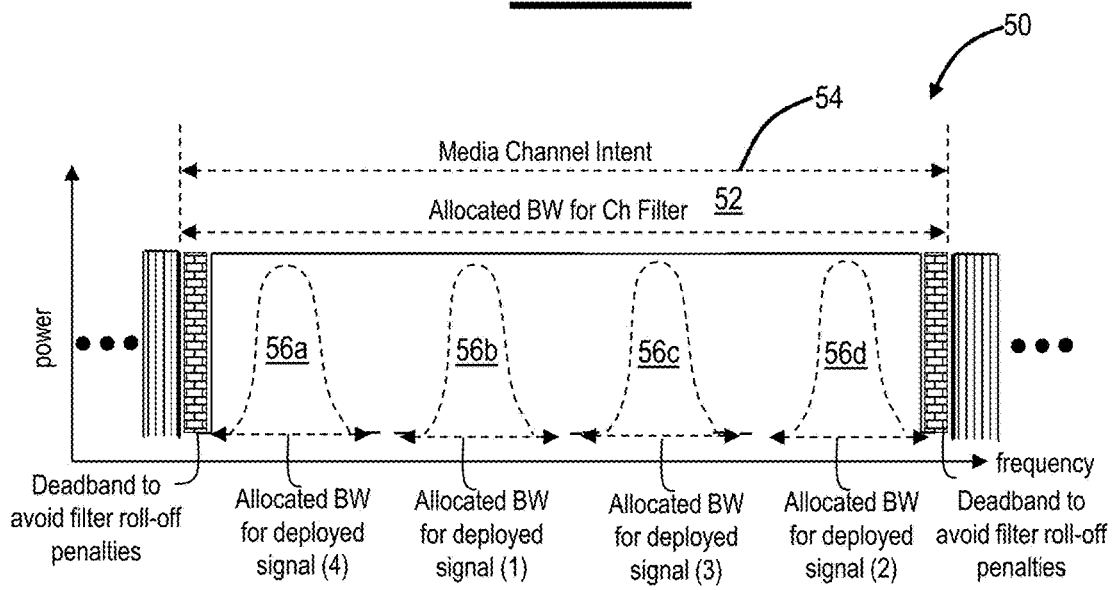

FIGS. 6A-6D are graphs 50 of optical spectrum illustrating example operations on a media channel 52 including initial provisioning and subsequent channel additions. In FIG. 6A, the media channel 52 is initially provisioned having the bandwidth intent 54 and a single channel 56a. Accordingly, the WSS 22 is configured with an allocated bandwidth for an optical filter for the channel 56a and for deadbands to avoid filter roll-off penalties. In FIG. 6B, a second channel 56b is added, i.e., detected at the WSS 22. In this example, the channel 56b is adjacent spectrally to the channel 56a. Accordingly, the WSS 22 is configured to open the optical filter for the channel 56b. In FIG. 6C, different from FIG. 6B, the second channel 56b is added, but the second channel 56b is non-adjacent to the signal 56a. Here, the WSS 22 leaves the allocated bandwidth for the optical filter for the first channel 56a in place and opens allocated bandwidth for an optical filter for the second channel 56b. FIG. 6D illustrates an embodiment where the media channel 52 is fully occupied, in this example, with four channels 56a-56d.

Figure 7:
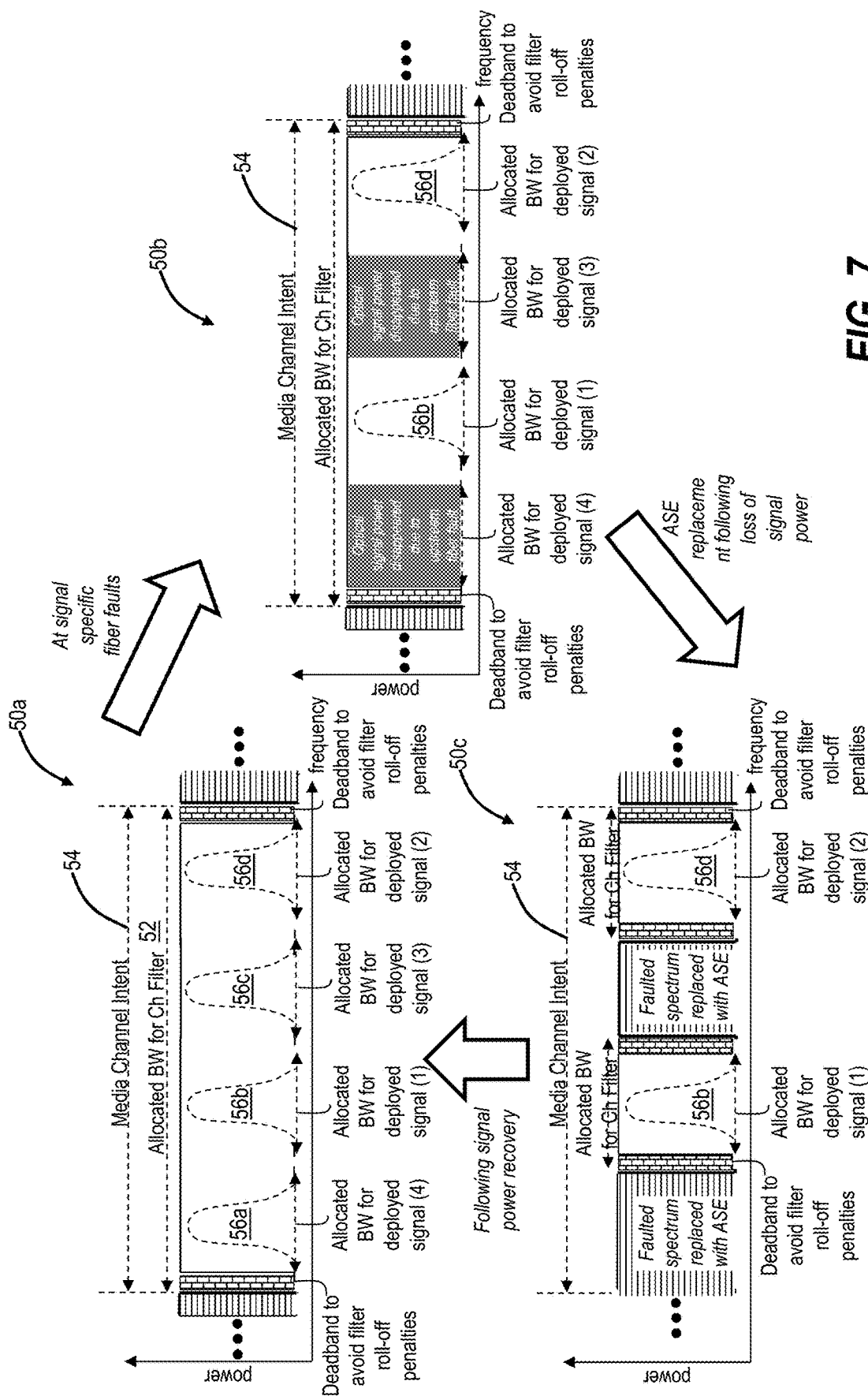
FIG. 7 is graphs of optical spectrum illustrating example operations on a media channel including full media channel occupancy, loss of channels, and readjustment with channel holders to replace the lost channels.

FIG. 7 is graphs 50a, 50b, 50c of optical spectrum illustrating example operations on a media channel 52 including full media channel occupancy, loss of channels, and readjustment with channel holders to replace the lost channels. In a graph 50a, the media channel 52 is fully occupied with the four channels 56a-56d. In a graph 50b, there are fiber faults causing the signals 56a, 56c to be lost (i.e., disappear). For example, the fiber faults can be detected at the inputs of the WSS 22. In a graph 50c, the WSS 22 reconfigures the optical filters to match the present signals 56b, 56d and the faulted signals 56a, 56c are replaced with the channel holders. Note, the graph 50c can return back to the graph 50a after signal recovery and corresponding reconfiguration of the WSS 22.

Figure 8A:
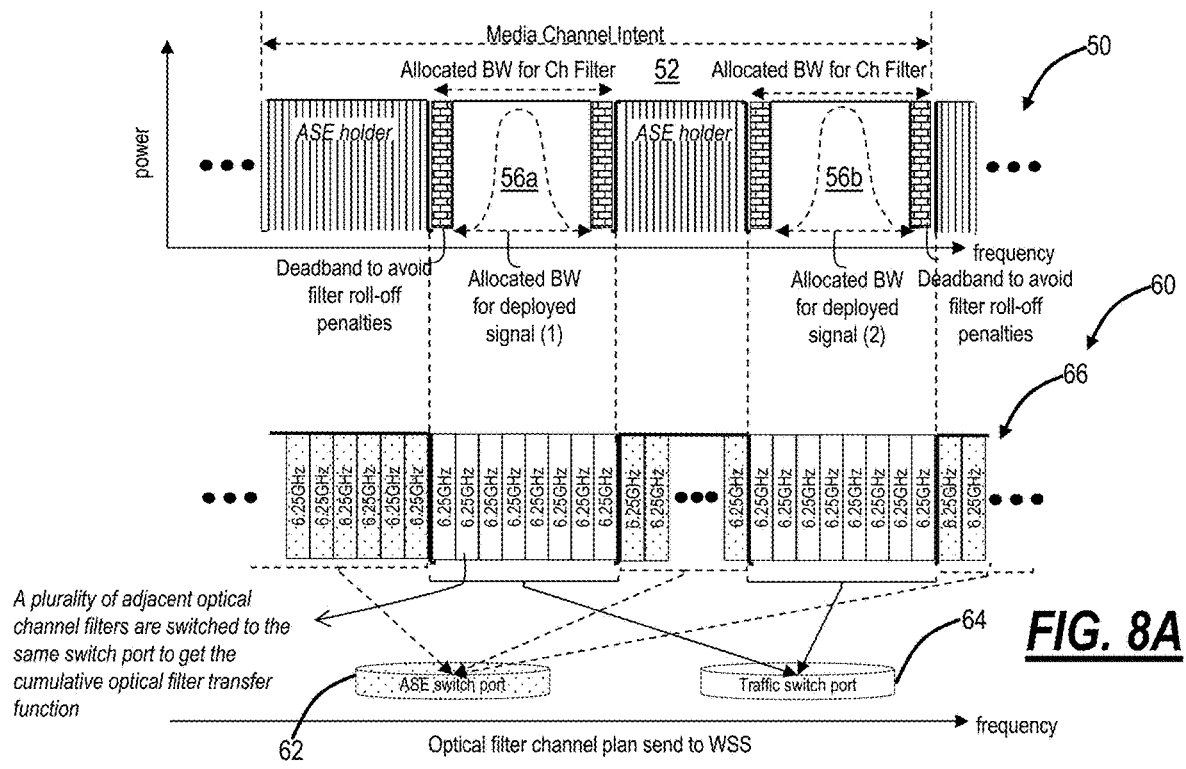
FIGS. 8A and 8B are graphs of optical spectrum with a corresponding filter plan based on a WSS illustrating channel additions.
Figure 8B:
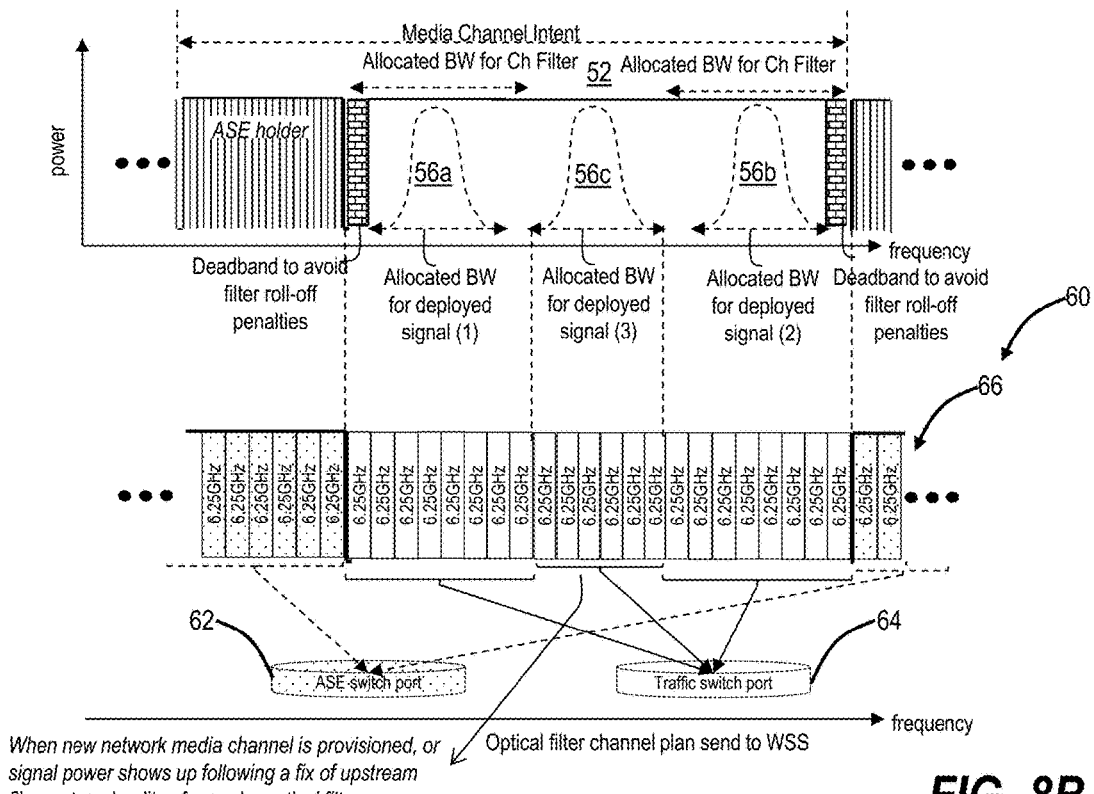

FIGS. 8A and 8B are graphs of optical spectrum with a corresponding filter plan based on a WSS illustrating channel additions. FIG. 8A is similar to FIG. 4 with two channels 56a, 56b configured and each being non-adjacent. FIG. 8B illustrates the addition of a third channel 56c by opening additional pixels 66 in the filter plan 60. Specifically, when new network media channel is provisioned, or signal power shows up following a fix of an upstream fiber cut, a plurality of granular optical filters are switched from the ASE switch port 62 to the traffic switch port 64.

Figure 9:
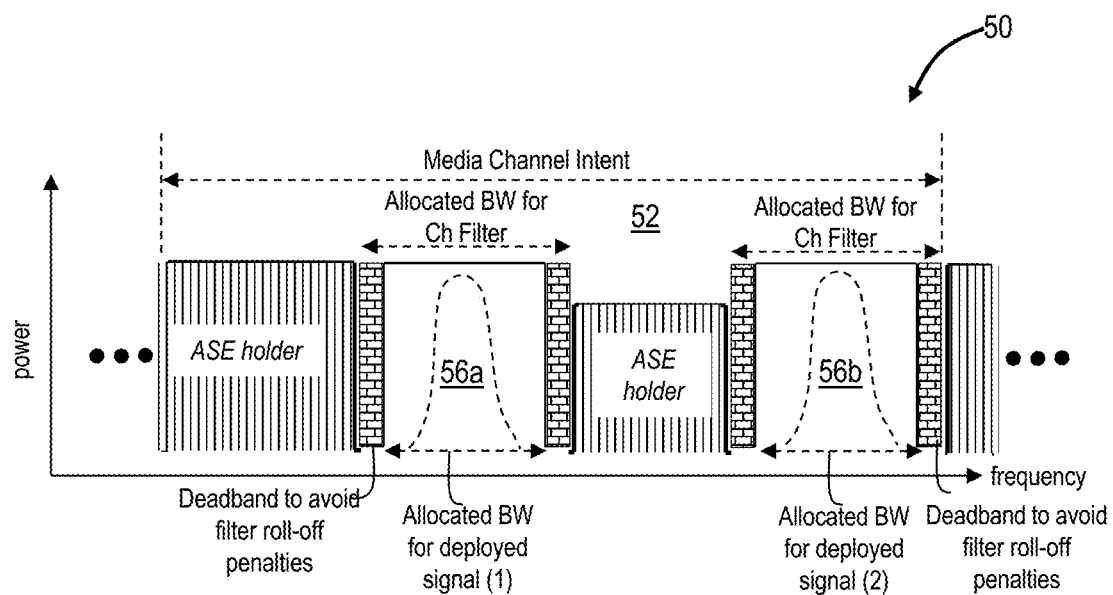
FIG. 9 is a graph of optical spectrum with channel holders between two channels in a media channel with the channel holder power reduced.

FIG. 9 is a graph 50 of optical spectrum with channel holders between two channels 56a, 56b in a media channel with the channel holder power reduced. FIG. 9 is a case where the spacing between the two channels 56a, 56b is not large in that having full power channel holders would impact the channels 56a, 56b. However, some ASE noise could be added between the channels 56a, 56b so long as it does not affect the signal shapes, or cause significant non-linear penalties. The ASE may not be as high due to lack of spectral space and forced power spectral shape available, or it may have a non-flat profile between the channels 56a, 56b.

Figure 10:
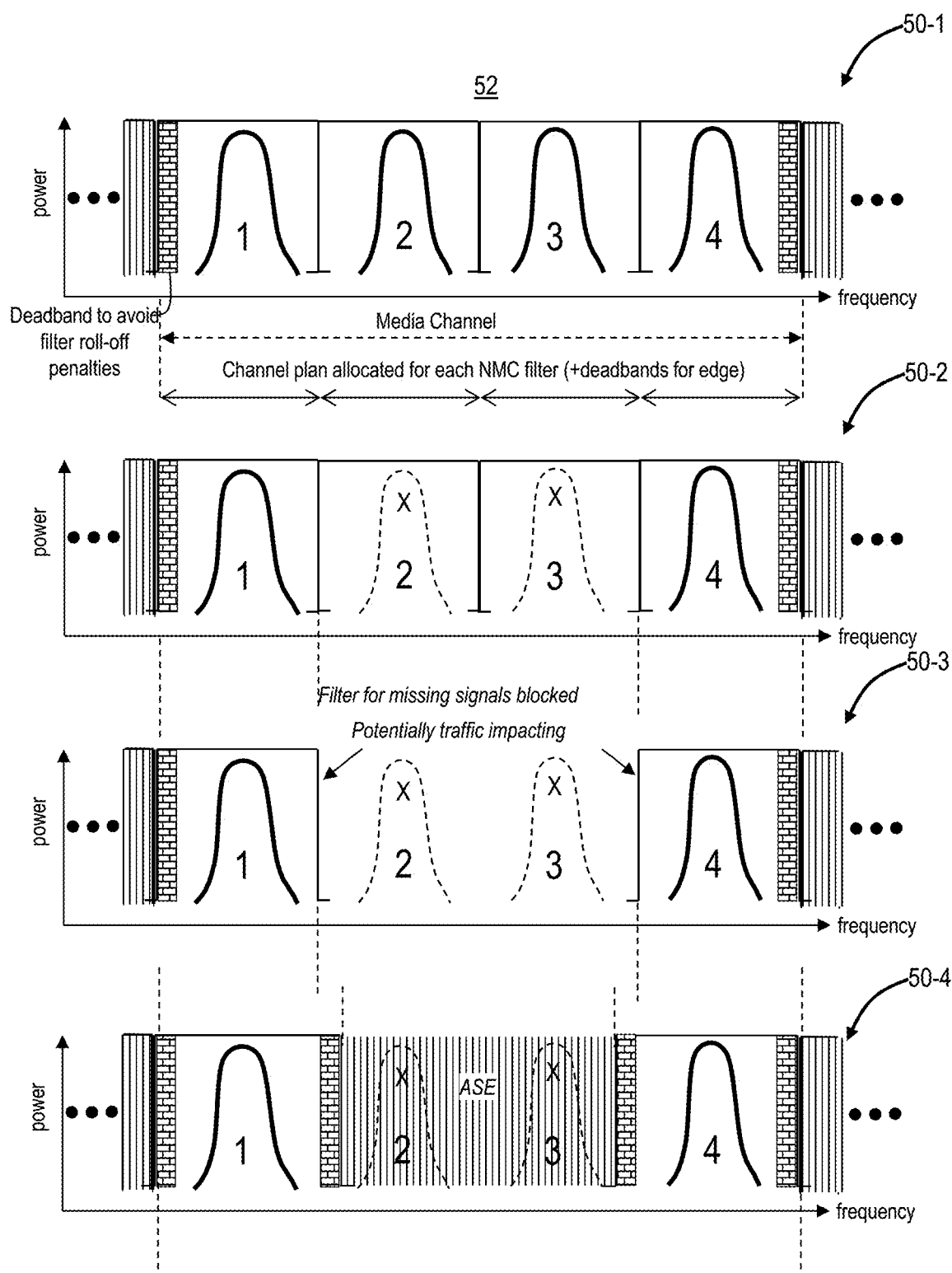
FIG. 10 is graphs of optical spectrum illustrating an approach to splitting and merging optical filters.

FIG. 10 is graphs 50-1, 50-2, 50-3, 50-4 of optical spectrum illustrating an approach to splitting and merging optical filters. Again, the conventional approach for a media channel is to match the optical filter channel plan with the media channel. The present disclosure describes changing the optical filter channel plan to match the NMC bandwidth inside the media channel. In the graph 50-1, there are four NMCs in the media channel 52, at full-fill. The optical channel plan or filter opening is created for each individual NMC, along with additional deadbands allocated to avoid filter roll-off penalties at the edge of the media channel 52. Consider the case in the graph 50-2, where 2× middle NMCs loss their power due to fiber fault or transmitter fault upstream. In this case, in a channel holder-based optical link, those missing signals should be replaced with channel holders to restore the total power to the line.

In this case, in the graph 50-3, channel filters for NMCs #2 & 3 cannot be switched to the ASE switch port 62 directly since that will impair NMCs #1 and #4. The channel plan allocated for NMC #1 and #4 cannot be extended either since that will overlap with NMC #2 and #3. Hence, to extend NMC #1 and #4 first, the option would be to delete or block channel plan for NMC #2 and #3. Depending on how many WSSs 22 the signals are traversing through, blocking/deleting NMC #2 and #3 will right away create filter penalties for NMC #1 and #4. In the graph 50-4, the WSS 22 can be configured to adjust the filters for the NMC #1 and #4. The remaining spectrum for NMC #2 and #3 then can be switched to fill with ASE.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:
1. An optical network element comprising:
an optical multiplexing/demultiplexing device forming a degree;
a channel holder source connected to the optical multiplexing/demultiplexing device; and
a controller configured to
responsive to provisioning a media channel on the degree, wherein the media channel is a contiguous portion of optical spectrum supporting N channels, N>1, cause allocation of optical filter bandwidth in the optical multiplexing/demultiplexing device for M channels in the media channel, M<N,
cause provisioning of the M channels in the media channel, and
cause configuration of channel holders in the media channel from the channel holder source, for N−M channels,
wherein the allocation of the optical filter bandwidth includes configuring a plurality of pixels in the optical multiplexing/demultiplexing device to connect to associated traffic ports of the M channels, and wherein the configuration of the N−M channel holders includes configuring a second plurality of pixels to connect to the channel holder source.

2. The optical network element of claim 1, wherein the media channel has a bandwidth intent to support the N channels, and wherein the allocation of optical filter bandwidth is for less than the bandwidth intent.

3. The optical network element of claim 1, wherein the optical multiplexing/demultiplexing device is a Wavelength Selective Switch and the allocation of optical filter bandwidth includes switching a plurality of adjacent filters to a same switch port for each of the M channels, to provide an effective filter function as required for signal propagation of the M channels.

4. The optical network element of claim 1, wherein the controller is further configured to
detect a new channel different from the M channels, and
cause allocation of optical filter bandwidth in the optical multiplexing/demultiplexing device for the new channel.

5. The optical network element of claim 4, wherein the allocation of optical filter bandwidth includes a minimum spectral occupancy required by an optical signal or carrier plus a spectral deadband required on each side of that signal to avoid filter roll-off penalties.

6. The optical network element of claim 1, wherein the controller is further configured to
detect loss of one of the M channels,
cause deallocation of optical filter bandwidth in the optical multiplexing/demultiplexing device for the lost channel, and
cause configuration of a channel holder for the lost channel from the channel holder source.

7. The optical network element of claim 1, wherein the controller is further configured to
merge allocated optical filter bandwidth to a single optical filter space if spacing between two adjacent filter edges is less than a minimum spectral occupancy required to accommodate any signal bandwidth.

8. An optical network element comprising:
an optical multiplexing/demultiplexing device forming a degree;
a channel holder source connected to the optical multiplexing/demultiplexing device; and
a controller configured to
responsive to provisioning a media channel on the degree, wherein the media channel is a contiguous portion of optical spectrum supporting N channels, N>1, cause allocation of optical filter bandwidth in the optical multiplexing/demultiplexing device for M channels in the media channel, M<N,
cause provisioning of the M channels in the media channel, and
cause configuration of channel holders in the media channel from the channel holder source, for N−M channels,
wherein the optical multiplexing/demultiplexing device is a Wavelength Selective Switch and the allocation of optical filter bandwidth includes switching a plurality of adjacent filters to a same switch port for each of the M channels, to provide an effective filter function as required for signal propagation of the M channels.

9. The optical network element of claim 8, wherein the allocation of the optical filter bandwidth includes configuring a plurality of pixels in the optical multiplexing/demultiplexing device to connect to associated traffic ports of the M channels, and wherein the configuration of the N−M channel holders includes configuring a second plurality of pixels to connect to the channel holder source.

10. The optical network element of claim 8, wherein the media channel has a bandwidth intent to support the N channels, and wherein the allocation of optical filter bandwidth is for less than the bandwidth intent.

11. The optical network element of claim 8, wherein the controller is further configured to
detect a new channel different from the M channels, and
cause allocation of optical filter bandwidth in the optical multiplexing/demultiplexing device for the new channel.

12. The optical network element of claim 11 wherein the allocation of optical filter bandwidth includes a minimum spectral occupancy required by an optical signal or carrier plus a spectral deadband required on each side of that signal to avoid filter roll-off penalties.

13. The optical network element of claim 8, wherein the controller is further configured to
detect loss of one of the M channels,
cause deallocation of optical filter bandwidth in the optical multiplexing/demultiplexing device for the lost channel, and
cause configuration of a channel holder for the lost channel from the channel holder source.

14. The optical network element of claim 8, wherein the controller is further configured to
merge allocated optical filter bandwidth to a single optical filter space if spacing between two adjacent filter edges is less than a minimum spectral occupancy required to accommodate any signal bandwidth.

15. An optical network element comprising:
an optical multiplexing/demultiplexing device forming a degree;
a channel holder source connected to the optical multiplexing/demultiplexing device; and
a controller configured to
responsive to provisioning a media channel on the degree, wherein the media channel is a contiguous portion of optical spectrum supporting N channels, N>1, cause allocation of optical filter bandwidth in the optical multiplexing/demultiplexing device for M channels in the media channel, M<N,
cause provisioning of the M channels in the media channel,
cause configuration of channel holders in the media channel from the channel holder source, for N−M channels,
detect loss of one of the M channels,
cause deallocation of optical filter bandwidth in the optical multiplexing/demultiplexing device for the lost channel, and
cause configuration of a channel holder for the lost channel from the channel holder source.

16. The optical network element of claim 15, wherein the allocation of the optical filter bandwidth includes configuring a plurality of pixels in the optical multiplexing/demultiplexing device to connect to associated traffic ports of the M channels, and wherein the configuration of the N−M channel holders includes configuring a second plurality of pixels to connect to the channel holder source.

17. The optical network element of claim 15, wherein the media channel has a bandwidth intent to support the N channels, and wherein the allocation of optical filter bandwidth is for less than the bandwidth intent.

18. The optical network element of claim 15, wherein the optical multiplexing/demultiplexing device is a Wavelength Selective Switch and the allocation of optical filter bandwidth includes switching a plurality of adjacent filters to a same switch port for each of the M channels, to provide an effective filter function as required for signal propagation of the M channels.

19. The optical network element of claim 15, wherein the controller is further configured to
    detect a new channel different from the M channels, and
    cause allocation of optical filter bandwidth in the optical multiplexing/demultiplexing device for the new channel.

20. The optical network element of claim 15, wherein the controller is further configured to
    merge allocated optical filter bandwidth to a single optical filter space if spacing between two adjacent filter edges is less than a minimum spectral occupancy required to accommodate any signal bandwidth.

* * * * *

UNITED STATES PATENT AND TRADEMARK OFFICE
CERTIFICATE OF CORRECTION

PATENT NO. : 10,735,837 B1
APPLICATION NO. : 16/508392
DATED : August 4, 2020
INVENTOR(S) : Choudhury A. Al Sayeed et al.

It is certified that error appears in the above-identified patent and that said Letters Patent is hereby corrected as shown below:

In the Claims

In Column 14, Lines 30-52, Claim 15 should be changed to:
15. An optical network element comprising:
    an optical multiplexing/demultiplexing device forming a degree;
    a channel holder source connected to the optical multiplexing/demultiplexing device; and
    a controller configured to
        responsive to provisioning a media channel on the degree, wherein the media channel is a contiguous portion of optical spectrum supporting N channels, N>1, cause allocation of optical filter bandwidth in the optical multiplexing/demultiplexing device for M channels in the media channel, M<N,
        cause provisioning of the M channels in the media channel,
        cause configuration of channel holders in the media channel from the channel holder source, for N−M channels,
        merge allocated optical filter bandwidth to a single optical filter space if spacing between two adjacent filter edges is less than a minimum spectral occupancy required to accommodate any signal bandwidth.

In Column 15, Lines 10-15, Claim 20 should be changed to:
20. The optical network element of claim 15, wherein the controller is further configured to
    detect loss of one of the M channels,
    cause deallocation of optical filter bandwidth in the optical multiplexing/demultiplexing device for the lost channel, and
    cause configuration of a channel holder for the lost channel from the channel holder source.

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*